UNITED STATES PATENT OFFICE.

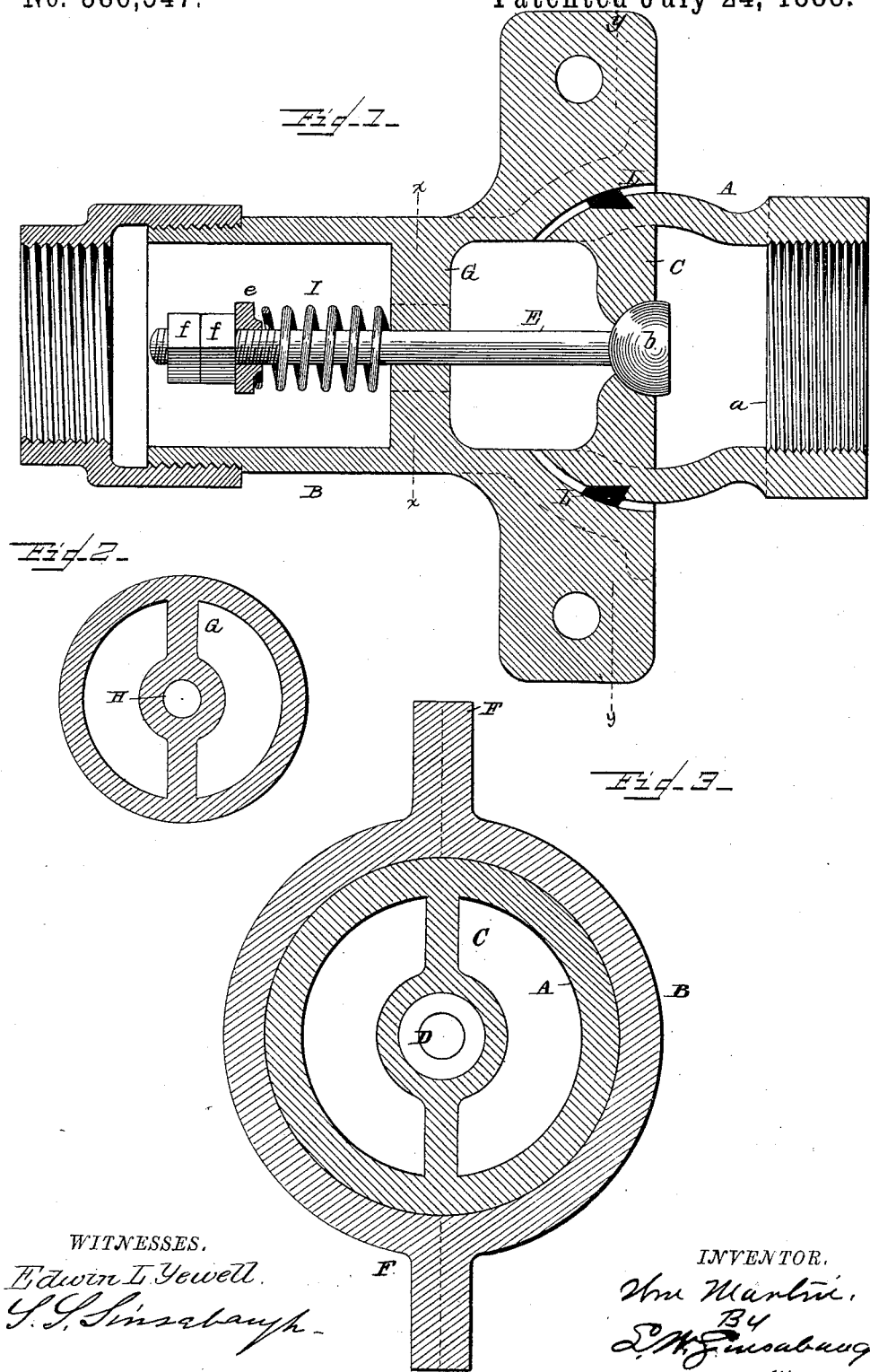

WILLIAM MARTIN, OF DUNKIRK, NEW YORK.

PIPE OR TUBE COUPLING.

SPECIFICATION forming part of Letters Patent No. 386,547, dated July 24, 1888.

Application filed May 31, 1887. Serial No. 239,820. (No model.)

*To all whom it may concern:*

Be it known that I, WILLIAM MARTIN, a citizen of the United States, residing at Dunkirk, in the county of Chautauqua, State of New York, have invented certain new and useful Improvements in Pipe or Tube Couplings, of which the following is a specification, reference being had therein to the accompanying drawings.

My invention relates to improvements in couplings for pipes or tubes, and is designed more especially for connecting the ends of the steam-pipes used in heating railway-cars.

The object of my invention is to provide a cheap and reliable pipe-coupling which will allow the adjacent ends of the pipes or tubes to move in a vertical or lateral direction, while at the same time a perfect joint will be at all times preserved.

My invention consists of a ball-and-socket joint for coupling pipes and tubes, the ball or sphere being held in contact with the socket by an internal fastening device.

Referring to the drawings, Figure 1 is a longitudinal sectional view of my improved coupling. Fig. 2 is a sectional end view on the line $x$ $x$ of Fig. 1. Fig. 3 is also a sectional end view on the line $y$ $y$ of Fig. 1.

A indicates the ball or spherical portion of my improved pipe-coupling, said ball or sphere being cast or otherwise formed and provided with the usual screw-threads, $a$, on one end of the extension, while the other end is open to communicate with the socket end of the pipe or tube B.

C is a cross-bar, which may be cast with or otherwise secured in the front portion of the ball or sphere A, said cross-bar being provided with a central concave aperture to receive the convex head $b$ of the bolt E.

As before intimated, B indicates the socket end of the coupling, which is also cast in one piece and provided with the flanges F, by which it is secured to suitable braces or supports when used as a pipe-coupling for heating cars by steam; but when designed for a pipe or hose coupling generally the flanges F are omitted. The cavity of the socket B is made concave to correspond with the curvature and to receive the ball or sphere A.

G is a cross-bar cast or otherwise secured in the extension of the socket-section, said cross-bar being provided with a central aperture, H, through which the bolt E passes. The bolt E extends a short distance beyond the cross-bar G, and is provided with screw-threads at one end to receive the washer $e$ and nuts $f$.

I is a spiral spring which surrounds the bolt E, one end of said spring being confined by the cross-bar G, while the other end of said spring impinges against the washer or nut $e$, the tension of the spring being regulated by the nuts $f$.

The office or function of the bolt E is to hold the ball A securely in position in the socket B, and by reason of its convex head and the concave opening D allows the ball to move at any angle except a right angle, while the spring I will allow the joint to yield when an undue strain or shock is brought to bear on the same in a longitudinal direction. The opening in the cross-bar C may be perfectly plain and the head of the bolt flat on the under side; but in this construction the bolt E should be in two parts and connected by a universal joint, so as to admit of the free movement of the ball or sphere A in the socket B.

L indicates a circular groove or channel, preferably of the form shown, formed in the periphery of the ball or sphere or in the concave or socket portion, into which is placed vulcanized rubber, asbestus, or other suitable packing material, M, which will form a safe and reliable joint.

It is obvious that instead of the cross-bar C suitable lugs or arms may be formed on the inside of the ball or sphere, with which the bolt E is caused to engage, and such a construction I consider within the spirit and scope of my invention.

Having thus described my invention, what I claim, and desire to secure by Letters Patent, is—

1. A ball-and-socket joint for connecting pipes and tubes, the internal portions of which are provided with lugs or cross-bars, and the bolt connected with the internal lugs or cross-bars to permit the parts to have a universal and free movement relative to each other, substantially as set forth.

2. A ball-and-socket joint for connecting pipes and tubes, the internal portions of which are provided with lugs or cross-bars, and the bolt and spring mounted thereon connected with the internal lugs or cross-bars, all arranged and operating substantially as and for the purpose set forth.

In testimony whereof I affix my signature in presence of two witnesses.

WM. MARTIN.

Witnesses:
J. H. LASCELLES,
J. O. STILLMAN.